United States Patent Office 3,657,139
Patented Apr. 18, 1972

3,657,139
PYRENE DERIVATIVES AS OPTICAL
BRIGHTENERS
Peter John Brocklehurst and Eric Hemingway, Manchester, England, assignors to Imperial Chemical Industries Limited, London, England
No Drawing. Filed Nov. 17, 1969, Ser. No. 877,501
Claims priority, application Great Britain, Dec. 10, 1968, 58,662/68
Int. Cl. C09k 1/02
U.S. Cl. 252—301.2 W       6 Claims

ABSTRACT OF THE DISCLOSURE

Pyrene-1-carboxylic acids and derivatives of these, such as 1-cyanopyrenes and esters and thiolesters of the carboxylic acids, are optical brightening agents for polymeric materials. Particularly effective brightening agents are the cyanoalkyl esters, especially cyanomethyl esters, prepared from salts of the corresponding acids by reaction with chloroalkylcyanides.

This invention relates to pyrene derivatives, and more particularly to pyrene-1-carboxylic acids and derivatives of these useful as optical brightening agents.

According to the invention there are provided brightened polymer compositions containing a pyrene derivative of the formula

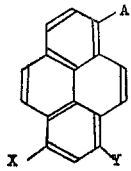

wherein A is a cyano group or a group of the formula $CO_2R$ or COSR in which R is a hydrogen atom or an alkyl, alkenyl, cycloalkyl, aryl, aralkyl or heterocyclic group or substituted derivative thereof, and X and Y are each a hydrogen or halogen atom or an alkyl group or a group of the Formula A except that both X and Y must not be groups of the Formula A.

According to a further feature of the invention there is provided a process for the brightening of polymeric materials by the incorporation into the said polymeric material of a pyrene derivative as defined above.

Polymeric materials which may be brightened according to the invention include synthetic polymeric materials, for examples polyamides such as polyhexamethylene adipamide and polycaprolactam, polyesters such as polyethylene terephthalate, polyurethanes, acrylonitrile polymers and copolymers and hydrolysed polyacrylonitriles, polymethyl methacrylate, polystyrene, polyethylene, polypropylene, artificial polymers for example secondary cellulose acetate, cellulose triacetate and regenerated cellulose such as viscose, and natural polymers for example cellulose such as cotton and paper, silk and wool.

The preferred method of incorporating the pyrene derivatives of the invention into the polymeric material, particularly when the polymeric material is a synthetic or artificial polymer in the form of a textile material is by treating the polymeric material with an aqueous dispersion of the pyrene derivative. Such dispersions may be obtained by milling the pyrene derivatives in water containing a suitable dispersing agent, for example disodium dinaphthylmethane disulphonate.

The aqueous dispersion is preferably substantially neutral, or slightly alkaline, but acid conditions may be employed if desired although not usually so effective. The use of substantially neutral suspensions in the process of the invention permits these brightening agents to be applied to textile materials at the same time as dispersed dyestuffs thus providing dyeings of brighter shade.

The temperature of application should be at least 40° C. In the case of secondary cellulose acetate the temperature is desirably about 85° C. since use of higher temperatures may soften the material, but with polyamides, cellulose triacetate, acrylonitrile polymers and copolymers and polyesters it is convenient to treat the polyamide material at the boiling point, about 95° C. to 100° C., of the aqueous suspension. Subject to any limitation imposed by the heat stability of the polymeric material higher temperatures, for example up to 140° C. under superatmospheric pressure if necessary, may be used.

Another method of application, of particular value with synthetic polymeric materials such as polyethylene terephthalate, is to impregnate the fabric with an aqueous suspension of the pyrene derivative by padding, preferably at room temperature, and then to dry the fabric by heating in air at a temperature between 150° C. and 200° C., and preferably at about 180° C. for a short period, preferably between 20 and 30 seconds.

Surface-active agents, for example fatty alcohol-ethylene oxide condensates or sulphonated alkylnaphthalenes may be added with advantage, and it is in many cases convenient to disperse the pyrene derivative in a soap or detergent, which is then used to wash and brighten simultaneously the textile material from an aqueous medium. The incorporation of these compounds in soaps or detergents also improve the appearance of the soaps or detergents and this constitutes a further feature of the invention.

The pyrene derivatives may be used in conjunction with other brightening agents, for example substituted 4:4'-ditriazinyliminostilbene - 2:2' - disulphonic acids, in order to increase the brightening effect on certain textile materials, for example cotton and wool when mixtures of textile materials are being treated.

The pyrene derivatives may also be used for the mass colouration of the polymeric materials by conventional procedures. For example the pyrene derivative is mixed with the polymeric material in powder or chip form which is then shaped, for example by spinning, in molten or plasticised form. In cases where the polymeric material, for example viscose, is spun from aqueous solution the pyrene derivatives may be dispersed in the aqueous solution before spinning.

The preferred pyrene derivatives for use as brightening agents are those in which A represents $CO_2R$ group and R represents a cyanoalkyl, especially cyanomethyl, group since these compounds show a higher level of whitening effect on polyethylene terephthalate and the fastness to light is particularly good. These pyrene derivatives in which R represents a cyanoalkyl group are new compositions of matter and form a further feature of the invention.

These cyanoalkyl esters may be prepared by reaction of a salt, such as the sodium salt, of the corresponding carboxylic acid (the pyrene derivative wherein A is a $CO_2H$ group) with a chloroalkyl cyanide. This process is conveniently carried out in a solvent such as boiling toluene in presence of an acid binding agent such as triethylamine.

As examples of other groups which may be represented by A in the pyrene derivatives used in the invention there are mentioned $CO_2R$ or COSR groups in which R is an alkyl group such as methyl, ethyl, propyl, isopropyl, or sec-butyl, a substituted alkyl group such as 2-chloroethyl, 2-hydroxyethyl, 2-methoxyethyl, 2-acetoxyethyl, an alkenyl group such as allyl, crotonyl or methylallyl, a cyclo alkyl group such as cyclohexyl, an aryl group such as phenyl, p-chlorophenyl or p-methylphenyl, an aralkyl group such as benzyl or β-phenylethyl, or an arylalkenyl group such as cinnamyl.

As examples of groups which may be represented by X and Y in the pyrene derivatives used in the invention there are mentioned halogen atoms such as bromine and especially chlorine, and alkyl groups such as methyl.

As examples of pyrene derivatives used in the invention there are mentioned methyl pyrene-1-carboxylate, dimethyl pyrene-1,6-dicarboxylate, allyl pyrene-1-carboxylate, cinnamyl pyrene-1-carboxylate, cyanomethyl pyrene-1-carboxylate, 1-cyanopyrene, 1,6-dicyanopyrene or ethyl pyrene-1-thiocarboxylate.

The pyrene derivatives may be prepared for example from the corresponding pyrene carboxylic acids by conventional means, for example conversion into the acid chlorides which are then esterified by the appropriate alcoholic compound. The pyrene carboxylic acids can be obtained by oxidation of the corresponding acetylpyrenes or by reaction of carbon dioxide with the corresponding sodio derivative of pyrene. Another convenient procedure is to react the pyrene with phenylethylcarbamoyl chloride in presence of a Friedel-Crafts catalyst followed by hydrolysis of the anilide obtained.

The pyrene derivatives used in the invention afford brightening effects on artificial and synthetic fibres which show a high degree of fastness to light; the brightening effects of especially the methyl and cyanomethyl esters is particularly good on polyethylene terephthalate with high fastness to light.

The invention is illustrated but not limited by the following examples in which all parts and percentages are by weight unless otherwise stated.

EXAMPLE 1

24.6 parts of pyrene-1-carboxylic acid and 250 parts of toluene are stirred and warmed to 95–100° C. and 13.3 parts of thionyl chloride added portionwise over ½ hour and the mixture stirred and heated at 100° C. until the evolution of hydrochloric acid ceases. The mixture is then cooled and 100 parts of methyl alcohol added and the mixture heated at the boil for 1 hour and the solvents removed by steam distillaton. The residual oily solid is stirred and cooled whereupon it solidifies and is isolated by filtration, washing with water and drying. Methyl pyrene-1-carboxylate, melting at 72–4° C., is obtained, and can be further purified by recrystallisation from methanol to give yellow needles melting at 81–2° C.

Found (percent): C, 82.8; and H, 4.4. $C_{18}H_{12}O_2$ percent requires: C, 83.1; and H, 4.6.

EXAMPLE 2

Using the same quantities as described in Example 1 except using ethyl alcohol instead of methyl alcohol, 25 parts of ethyl pyrene-1-carboxylate melting at 58–9° C. are obtained. This can be further purified by recrystallisation from ethyl alcohol to give yellow needles melting at 62–3° C.

EXAMPLE 3

6.0 parts of the sodium salt of pyrene-1-carboxylic acid, 3.2 parts of β-chloroacetonitrile, 4.2 parts of triethylamine and 75 parts of toluene are mixed and heated to 95–100° C. and stirred at this temperature for 5 hours. The toluene layer is then decanted from the tarry layer and diluted with petroleum ether. The precipitated solid is isolated by filtration, washing with petrol and drying to give cyanomethyl pyrene-1-carboxylate melting at 140–3° C. Recrystallisation from ethyl alcohol gives material melting at 146–7° C.

Found (percent): C, 79.8; H, 3.6; and N, 5.1. $C_{19}H_{11}NO_2$ (percent) requires: C, 80.0; H, 3.8; and N, 4.9.

EXAMPLE 4

6.0 parts of pyrene carboxylic acid sodium salt, 3.1 parts of triethylamine and 4.6 parts of the β-methoxyethyl ester of monochloroacetic acid are reacted together in 50 parts of toluene by the procedure described in Example 3 to give β-methoxyethoxycarbonylmethyl carboxylate melting at 77–8° C.

EXAMPLE 5

By the procedure of Example 3 but using 4.0 parts of the ethyl ester of monochloroacetic acid, there is obtained the ethoxycarbonylmethyl ester of pyrene-1-carboxylic acid melting at 94–6° C. Recrystallisation from ethyl alcohol raises the melting point to 96–7° C.

EXAMPLE 6

5.84 parts of pyrene 1,6-dicarboxylic acid, 5.2 g. of thionyl chloride and 100 parts of toluene are mixed and heated to 100° C. until the evolution of acid gases has ceased and the resulting solution of pyrene-1,6-dicarboxylic acid chloride is added to 100 parts of methyl alcohol and the mixture heated at 65° C. for 2 hours. The product which precipitates on cooling is isolated by filtration, washing with methanol and drying to give dimethyl pyrene-1,6-dicarboxylate as a pale yellow solid melting at 188° C. Recrystallisation from toluene gives material melting at 200° C.

Found (percent): C, 75.3; and H, 4.5. $C_{20}H_{14}O_4$ (percent) requires: C, 75.5; and H, 4.4.

EXAMPLE 7

17.7 parts of the mixed isomers of pyrene-1,6- and pyrene-1,8-dicarboxylic acid, 16.8 parts of triethylamine, 12 parts of p-chloroacetonitrile and 400 parts of toluene are mixed and heated at 45° C. for 6 hours. The toluene solution is then decanted from the oily layer and diluted with petroleum ether (80–100° C.). The precipitated yellow solid is isolated by filtration, washing with petrol and drying. Mixed biscyanomethyl pyrene-1,6- and pyrene-1,8-carboxylates are obtained melting at 223–227.

Found (percent): C, 70.7; H, 3.2; and N, 7.4. $C_{22}H_{12}O_4N_2$ (percent) requires: C, 71.7; H, 3.3; and N, 7.6.

EXAMPLE 8

A dispersion is prepared by gravel milling 1 part of pyrene-1-methylcarboxylate in a solution of 1 part of a sulphonated alkyl naphthalene (or a fatty alcohol-ethylene oxide condensate) in 100 parts of water until the particle size has been reduced to $<5\mu$. 10 parts of this dispersion are added to a bath containing 400 parts of water and 10 parts of polyethylene terephthalate fibre and the whole warmed to 90–95° C. during 30 minutes and maintained at this temperature for 30 minutes. After rinsing and drying, the fibre is much whiter and brighter in appearance than untreated fabric.

Nylon, polyacrylonitrile and cellulose triacetate fabrics are similarly improved in whiteness after treatment with the same fluorescent compound.

EXAMPLE 9

1 part of the biscyanomethyl ester of pyrene 1,6- and pyrene-1,8-dicarboxylic acid is dispersed in 100 parts of water containing 1 part of an anionic dispersing agent (a sulphonated alkyl naphthalene) until the particle size is less than $5\mu$. 10 parts of this dispersion and 10 parts of polyethylene terephthalate fabric are added to 400 parts of water and the whole heated to 130° C. and 25 lb. pressure in a pressure dyeing machine. After rinsing with water and drying, the fabric is much brighter in appearance than untreated fabric. Nylon, polyacrylonitrile and cellulose acetate fabrics are similarly improved in appearance when treated in the same way.

EXAMPLE 10

12.3 parts of pyrene-1-carboxylic acid and 200 parts of toluene are stirred and warmed to 95° C. and 6.7 parts of thionyl chloride added portionwise over ½ hour and the mixture stirred and heated at 100–110° C. until the evolution of hydrochloric acid ceases. The excess of thionyl chloride is removed by the azeotropic distillation of 100 parts of toluene and the residual mixture add to a solution of 100 parts of allyl alcohol containing 2.2 parts of sodium hydroxide powder during 10 minutes at 20° C. and the mixture then warmed to 70° C. and maintained at this temperature for 1 hour. The toluene is removed by evaporation and the residual oily material triturated with aqueous alcohol whereupon 11 parts of yellow crystal of allyl pyrene-1-carboxylate are obtained melting at 65–70° C.

Found (percent): C, 83.6; and H, 4.9. $C_{20}H_{14}O_2$ (percent) requires: C, 83.9; and H, 4.9.

EXAMPLE 11

Using the same conditions as are described in Example 10 and substituting crotyl alcohol for allyl alcohol, 10 parts of crotyl pyrene-1-carboxylate melting at 57–8° C. are obtained.

Found (percent): C, 83.4; and H, 5.3. $C_{21}H_{16}O_2$ (percent) requires: C, 84.0; and H, 5.5.

EXAMPLE 12

23.6 parts of 1-chloropyrene and 10 parts of cuprous cyanide are mixed and warmed gradually during 1 hour to 300° C. when the molten mass becomes stirrable. Stirring and heating are continued to 340° C. for 1 hour, the dark coloured mass cooled, extracted with 4 successive portions of 50 parts boiling acetic acid and the combined acetic acid extracts poured onto water and the precipitated crude 1-cyano pyrene isolated by filtration and dried to give 5.5 parts melting at 149–52° C. Recrystallisation from 100–120° C. petrol affords yellow crystals melting at 152° C.

Found (percent): C, 89.6; H, 3.9; and N, 5.9. $C_{17}H_9$ (percent) requires: C, 90.0; H, 3.97; and N, 6.1.

EXAMPLE 13

8.7 parts of pyrene-1,6-dicarboxylic acid, 10.9 parts of p-toluene sulphonamide and 26.2 parts of phosphorus pentachloride are stirred together. The mixture is warmed to 80° C. and maintained at this temperature until the reactants have formed a solution. The temperature is raised, simultaneously allowing phosphorus oxychloride to distil off, until 200° C. has been reached and maintained at this temperature until no more phosphorus oxychloride is recovered. The mixture is cooled and 24 parts of pyridine cautiously added followed by 110 parts of water and the precipitated yellow solid isolated by filtration, extracted with dilute sodium hydroxide solution to remove unreacted pyrene carboxylic acid and the residual solid dried and recrystallised first from glacial acetic acid and then from monochlorobenzene to give 1,6-dicyanopyrene melting at 290–2° C.

Found (percent): C, 83.9; H, 2.9; and N, 11.1. $C_{18}H_8N_2$ (percent) requires: C, 85.7; H, 3.18; and N, 11.1.

EXAMPLE 14

4.92 parts of pyrene-1-carboxylic acid are converted to the acid chloride derivative in toluene solutions as described in the earlier examples and added to 30 parts of ethyl mercaptan and 1.2 parts of sodium hydroxide powder at 10–15° C. and stirred for 2 hours at this temperature and then warmed to 70° C. allowing the excess ethyl mercaptan to distil off. The toluene residues are evaporated to dryness on a steam bath and the resulting oily material recrystallised from a mixture of 50 parts of ethyl alcohol and 5 parts of water. The precipitated yellow oil gradually hardens and is eventually isolated by filtration and dried to give 3.2 parts of ethyl pyrene-1-thiocarboxylate melting at 59–61° C. and which gives a green shade of fluorescence in organic solvents.

Found (percent): C, 77.9; H, 4.6; and S, 10.7. $C_{19}H_{14}OS$ (percent) requires: C, 78.5; H, 4.8; and S, 11.0.

EXAMPLE 15

Repetition of Example 14 but using phenylmercaptan instead of ethyl mercaptan gives phenyl pyrene-1-thiocarboxylate, recrystallised from ethyl alcohol to a yellow crystalline product melting at 148° C.

Found (percent): C, 81.3; H, 4.1; and S, 9.5. $C_{23}H_{14}OS$ (percent) requires: C, 81.5; H, 4.1; and S, 9.5.

EXAMPLE 16

A toluene solution of pyrene-1-carboxylic acid chloride prepared from 4.92 part of pyrene-1-carboxylic acid is added to 25 parts of 1-phenylprop-1-en-3-ol and 1.2 parts of sodium hydroxide and the mixture warmed to 70° C. and maintained at this temperature for 2 hours. After evaporation on a steam bath, the residual oily solid is slurried with aqueous alcohol, filtered and recrystallised from alcohol to give 2.7 parts of pyrene-1-1-phenyl prop-1-en-3-yl carboxylate melting at 86–8° C.

Found (percent): C, 85.3; and H, 5.1. $C_{26}H_{18}O_2$ (percent) requires: C, 86; and H, 5.0.

EXAMPLE 17

The precedure of Example 8 is repeated using the pyrene derivatives prepared as described in Examples 2, 3, 4, 5, 6, 10, 11, 12 and 13. The polyethylene terephthalate fabric obtained is whiter and brighter in appearance than untreated polyethylene terephthalate fabric.

We claim:

1. A brightened polymer composition comprising a polymer and an optically brightening amount of a pyrene derivative of the formula

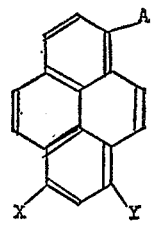

wherein A is cyano or a group of the formula $CO_2R$ or COSR in which R is hydrogen, cyanomethyl, alkyl of 1–4 carbon atoms, 2-chloroethyl, 2-hydroxyethyl, 2-methoxyethyl, 2-acetoxyethyl, β-methoxyethoxycarbonylmethyl, ethoxycarbonylmethyl, allyl, crotonyl, methallyl, cinnamyl, cyclohexyl, phenyl, p-chlorophenyl, p-tolyl, benzyl and β-phenylethyl, and X and Y are each hydrogen, halogen, methyl, or a group of the Formula A except that both X and Y must not be groups of the Formula A.

2. A polymer composition as claimed in claim 1 wherein the polymer is a polyamide.

3. A polymer composition as claimed in claim 1 wherein the polymer is a polyester.

4. A polymer composition as claimed in claim 1 wherein A is a $CO_2R$ group wherein R is a cyanomethyl group.

5. A polymer composition as claimed in claim 1 wherein X and Y are hydrogen atoms.

6. A polymer composition as claimed in claim 4 wherein X or Y is a cyanomethyl group.

References Cited

FOREIGN PATENTS 985,484   3/1965   Great Britain ___ 252—301.2 W

ROBERT D. EDMONDS, Primary Examiner